(## United States Patent [19]

Watanabe et al.

[11] 3,963,950
[45] June 15, 1976

[54] STATOR OF ROTARY ELECTRIC MACHINE

[75] Inventors: Masatoshi Watanabe; Noriyoshi Takahashi; Miyoshi Takahaski, all of Hitachi, Japan

[73] Assignee: Hitachi, Ltd., Japan

[22] Filed: Oct. 15, 1974

[21] Appl. No.: 514,958

[30] Foreign Application Priority Data
Oct. 17, 1973  Japan.............. 48-115908
Nov. 30, 1973  Japan.............. 48-133501

[52] U.S. Cl. ............................... 310/54; 310/64; 310/179
[51] Int. Cl.² .......................................... H02K 1/20
[58] Field of Search ............... 310/54, 55, 64, 65, 310/179, 194, 195, 260, 270, 57, 180

[56] References Cited
UNITED STATES PATENTS

| | | |
|---|---|---|
| 3,032,665 | 5/1962 | Wilholmson.................... 310/54 |
| 3,049,634 | 8/1962 | Horsley........................ 310/54 X |
| 3,082,337 | 3/1963 | Horsley........................ 310/179 |
| 3,109,947 | 11/1963 | Thompson et al............... 310/64 |
| 3,469,126 | 9/1969 | Wiedemann.................... 310/54 |
| 3,529,192 | 9/1970 | Davies......................... 310/179 |

*Primary Examiner*—Donovan F. Duggan
*Attorney, Agent, or Firm*—Craig & Antonelli

[57] ABSTRACT

A stator for an electric rotary machine adopting a so called gap winding system in which the stator winding is arranged on the smooth inner surface of the stator core. The winding strand groups arranged on the inner surface of the annular stator core are fixedly secured to cooling pipes formed in a cylindrical frame, so that the cooling pipes support the winding strand groups thereby to facilitate transportation and assemblage of the stator winding on the one hand and to provide a sufficiently rugged stator winding to withstand the mechanical stress due to vibrations or electrical short-circuiting which are caused during the running of the electric rotary machine.

2 Claims, 13 Drawing Figures

STATOR OF ROTARY ELECTRIC MACHINE

The present invention relates to an improvement in a stator used in a large-capacity turbine generator, a water wheel generator or the like, or more in particular to an improvement in a stator having a so-called gap winding in which a stator winding is fixed on the smooth inner surface of a stator core.

The generally known stator for a rotary electric machine is such that the winding of a stator is inserted in slots axially extending in the inner surface of the stator core and held by wedges not to come off the slots.

With the recent increase in capacity for each single unit, however, there is an increased gap between a stator and a rotor, and such a technique as to arrange a stator winding in the gap has been suggested. In such a gap winding type of electric rotary machine, the stator winding is disposed within the gap, that is, on the inner surface of the stator core, and an electric rotary machine with the capacity of as large as 2000 MW orders, for instance, has a gap 100 mm to 150mm depending on the short-circuiting ratio. Arrangement of the winding in this gap thus permits effective utilization of the gap and reduces the size and weight of the machine.

In other words, to the extent that the need for providing the slots for containing the winding in the core is eliminated, it is possible to reduce the outside diameter of the core, resulting in a smaller size and a lighter weight of the machine as a whole. Further, the absence of slots for containing the winding in the core obviates the problems of loss or mechanical strength so far often encountered by the slots and the teeth between the respective slots, thus making possible improved machine characteristics.

For the above-mentioned reasons, the gap winding is quite effective in the fields of large-capacity rotary electric machines and it is expected that the use of the gap winding will extend even wider in the future. In spite of this, the bringing of the winding from inside the slots simply out onto the inner surface of the stator core and fixed thereon will not be enough to successfully overcome such difficulties as supporting the whole winding strands, maintaining their shape intact and cooling the whole winding.

These problems become even more serious when considering, in addition to the deformation of the winding strands and the difficulty to support them securely on the smooth inner surface of the stator core against the vibration of the machine, the fact that the actual gap winding is comprised of very fine wires for the reason mentioned below.

The winding arranged on the inner surface of the core directly interlinks with a great amount of magnetic flux produced from the rotor, so that a large eddy current may be generated in the winding strands, for the prevention of which the fine wires are employed. As such wires, it is common practice to use strand conductors 1 mm or less in diameter. A great problem is naturally posed by the need for securing the winding of such very fine wires on the smooth internal surface of the stator core with sufficient stability to resist deformation and to withstand vibrations of the machine. Also, in assemblying the winding on the stator core, the trouble is that safe transportation of the winding, which are very feeble as they consist of such fine wires, requires a special jig as well as a temporary support.

Another difficulty is encountered in cooling the winding. Usually, a large-capacity rotary electric machine comprises windings composed of hollow wires so that a cooling medium may be passed through the hollow portion. However, since the strands of the gap winding in this case are very thin, as mentioned above, it is impossible to bore a hole through such a fine wire strand for passing a cooling medium. Even if a cooling gas is applied to flow along the outer surface of the winding the wires are to tightly stranded that inwardly arranged strands are not efficiently cooled by the cooling gas. This cooling problem has always been a matter of importance for which an effective solution is desired.

Accordingly, it is an object of the present invention to provide a stator of an electric rotary machine in which a stator winding is capable of being easily transported and assembled without using any special winding support or jig.

Another object of the invention is to provide a stator for the rotary electric machine having a stator winding sufficiently rugged to withstand mechanical stress which are caused by vibrations and electrically short-circuiting during the running of machine.

Still another object of the invention is to provide a stator of an electric rotary machine in which a stator winding is capable of being cooled effectively.

According to the present invention, there is provided a stator comprising an annular stator core, a stator winding including fine strands arranged on the inner surface of the stator core and cooling pipes formed in the form of a cylindrical frame fitted onto the inner surface fo the stator core, the winding strands being secured to the cylindrical frame of the cooling pipes.

The above and other objects, features and a advantages will be made apparent by the detailed description taken in conjunction with the accompanying drawings, in which.

Figure 1:
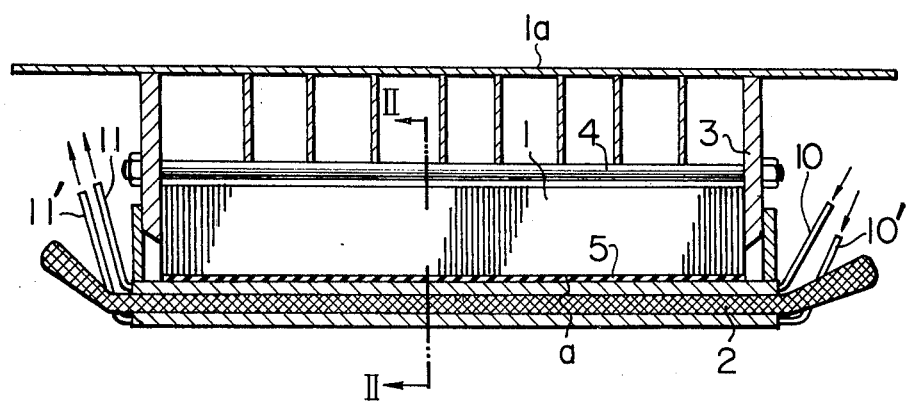
FIG. 1 is a longitudinal sectional side view showing the essential parts of the stator system according to the present invention.
Figure 2:
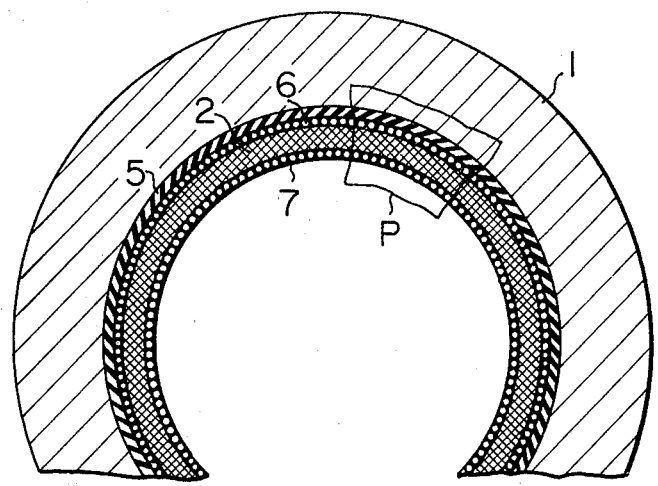
FIG. 2 is a diagram showing a section of the system of FIG. 1 in line II—II.

Referring to FIGS. 1 and 2 showing the sectional view of the essential portion of the stator arrangement according to the invention, the stator comprises mainly a stator core 1 and a stator winding 2. A stator frame 1a for holding the stator core 1 is provided on the outer periphery of the stator core 1, and a rotor is provided inside the stator winding 2 with a predetermined space therebetween.

The stator core 1 is annular in form and comprises a lamination of iron sheets having terminal sheets 3, thus constituting an integrated body through a bolt 4. The stator core has a smooth inner surface $a$ having no slots thereon for containing the winding.

The stator winding 2 is arranged on the inner surface of the stator core 1 and comprises a group of fine strands for reasons of prevention of electrical loss, as mentioned already. An insulating layer 5 is formed between the outer surface of the stator winding 2 and the inner surface of the core 1, and cooling pipes 6 are interposed between the insulating layer 5 and the winding 2. While the cooling pipes may be provided in as many layers as required, only two layers are provided in the embodiment shown in the drawings, one being cooling pipes 6 and the other being cooling pipes 7 which are respectively arranged on the outside and inside of the winding 2. The cooling pipes 6 and 7 are arranged adjacent to the respective outer and inner surfaces of the winding 2 as will be seen from the drawing and have the construction as described below.

Figure 3:
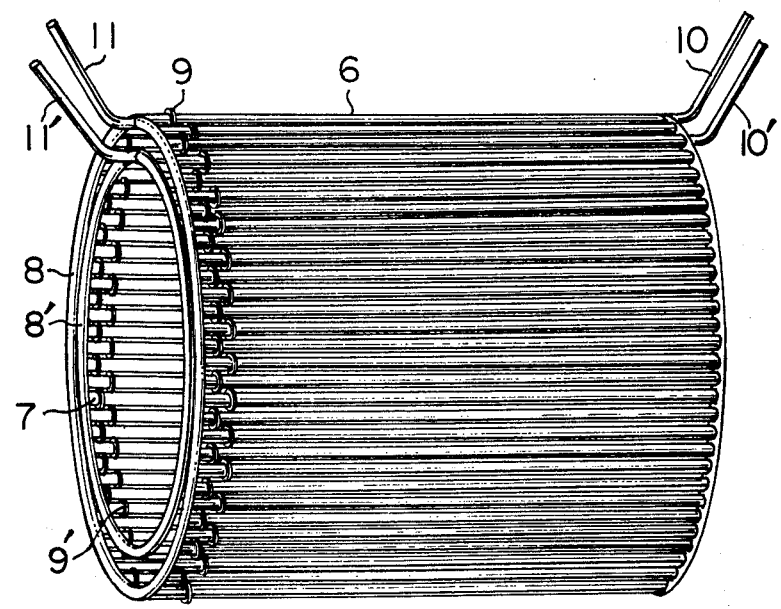
FIG. 3 is a perspective view showing the cooling pipe assembly.
Figure 4:
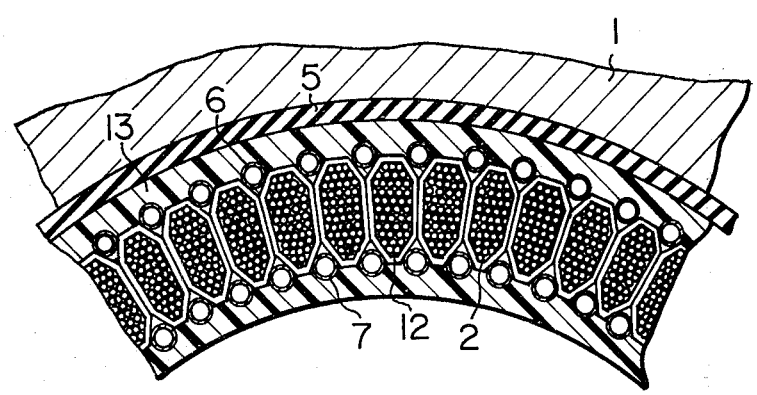
FIG. 4 is a diagram showing an embodiment of the invention illustrating the portion P of FIG. 2 in an enlarged form.

It will be noted from FIG. 3 showing the construction of the cooling pipes, the cooling pipes 6 and 7 are respectively coupled to annular master tubes 8 and 8' on both ends and form a cooling unit like a double-layer cage. If the cooling pipes are simply connected with the master tubes 8, a very high voltage will be induced in the cooling pipes as they interlink with magnetic flux applied from the rotor, with the result that the thus induced voltage enables currents to flow in electrical loop circuits formed by the cooling pipes 6, 7 and the master tubes 8, 8', thereby generating heat. Therefore, electrical insulating means such as insulating flanges 9, 9' may be provided in any point in the midway of the cooling pipes or the master tubes so as to prevent the formation of such electric loop circuit for the induced voltage. Reference numerals 10 and 10' show cooling medium supply tubes and 11 and 11' exhaust tubes for the cooling pipes 6 and 7 respectively.

In practice, the thus arranged cooling pipe assembly is securely integrated with the stator winding by means such as resin and arranged on the inner surface of the stator core 1.

In the thus arranged stator, since the winding is secured to the pre-formed cage-shaped cooling pipes, for example the winding is secured to the cooling pipes between the layers of double-layered cooling pipes as shown in the drawings, the great ruggedness of the cooling pipes enables realization of a strong winding structure in spite of the feeble strands making up the winding. Therefore, the assembly work for mounting the winding inside the core or in-factory transportation require no special tool or jig for protecting the winding or strands from being deformed at a saving of tension of nerves, thus facilitating the handling of the winding. Further, the winding is quite rugged against any stress which may arise from the vibrations or short-circuiting of the machine in operation, thereby making possible a highly reliable stator arrangement.

Also, the stator winding 2 is cooled adequately by the cooling medium supplied by the cooling medium supply tubes 10 and 10'.

In spite of the foregoing description of a double-layer cooling tube construction, more than two layers or only one layer may alternatively be employed as desired. From the viewpoint of cooling efficiency, however, the single-layer cooling pipe system which must be arranged at the center of the winding leads to the difficulty in arrangement of the master tubes and in taking out the cooling medium supply and exhaust tubes at the ends of the winding, as well as a great inconvenience accompanied thereby.

Figure 5:
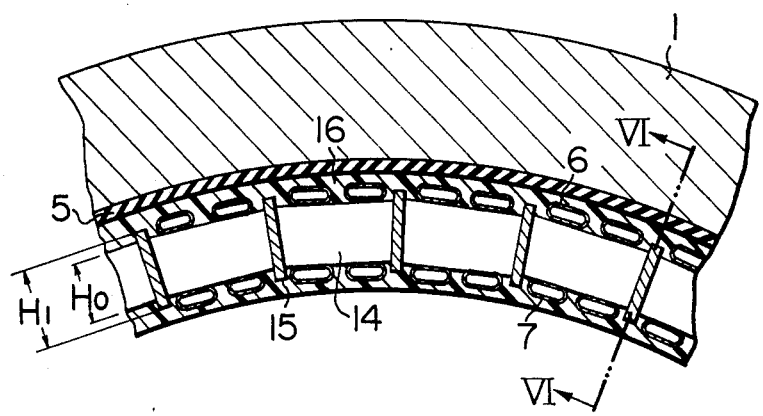
FIG. 5 shows the same portion as FIG. 4 according to another embodiment.
Figure 6:
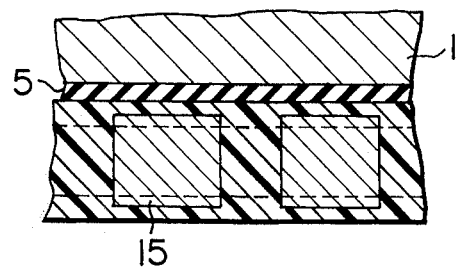
FIG. 6 shows a section in line VI—VI in FIG. 5.

In the case of a plurality of cooling pipe layers, on the other hand, the winding strands may be simply interposed between the layers so as to be intergrated with the pipes. Test results show, however, that if the winding strands 2 are assembled into blocks 12 and the cooling pipes 6 and 7 are arranged between the respective adjacent winding blocks 12, not only the whole assembly is little deformed in advance of injection of resin 13 but also a high working efficiency is achieved with an advantage in that the assembly becomes even more rugged after the cooling pipes 6 and 7 are integrated with the winding strands 2. Moreover, by inserting spacers 15 with the height $H_1$ greater than the height $H_0$ of winding blocks 14 between the respective adjacent winding blocks as shown in FIG. 5 and FIG. 6, not only the space between adjacent blocks may be regulated but also the respective blocks may be prevented from being deformed, in addition to the advantage that the blocks are secured by means of the resin 16 more firmly.

In spite of the advantages that the aforementioned arrangement makes possible a stator for the rotary electric machines the winding of which is easily assembled and transported and which is highly resistive to the mechanical stress and adequately cooled, the cooling pipe arrangement in parallel to the stator winding causes a voltage to be induced in the cooling pipes like that induced in the winding. For example, a voltage as high as 2000 V to 3000 V is induced across a single cooling pipe mounted in a turbine generator of 1000 MW order with the result that, as already mentioned above, the thus induced voltage enables currents to flow in electric loop circuits formed by the cooling pipes and master tubes, thereby generating heat. Thus, insulating means or insulating flanges 9, 9' are provided, as shown in FIG. 3, in suitable portions in the midway of the cooling pipes or master tubes so as to prevent the formation of such electric loop circuits. When leakage of the cooling medium at the insulating flange 9 and 9' becomes troublesome, the voltage which otherwise might be induced in the cooling pipes may be reduced by skewing the cooling pipes in the peripheral direction with respect to the longitudinal axis as shown in FIG. 7 and as will be explained hereinafter.

Figure 7:
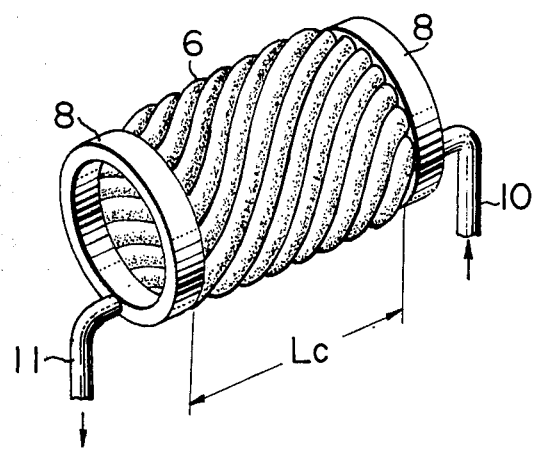
FIG. 7 is a perspective view showing the cooling pipe assembly according to another embodiment of the invention.

Referring to FIG. 7 illustrating a perspective view of the cooling pipes 6 and related component elements, a couple of annular master tubes 8 are provided at the opposite ends of the cooling pipes 6, the master tubes 8 including a cooling medium supply tube 10 and an exhaust tube 11 respectively connected to a cooling medium supply and exhaust device both not shown.

As will be obvious from the drawing, the axially extending cooling pipes 6 are skewed to a certain degree between the master tubes 8. The gradient of the cooling pipes thus skewed is of vital importance. The length shown by $L_C$ is substantially the same as the thickness of the stator core lamination, and within this length the cooling pipes 6 are skewed at the electrical angle of $360° \times k$ ($k$ being integer).

No voltage is induced across the cooling pipes of the above construction for the reason which will be described later. For this reason, any conductive pipes used as the cooling pipes need not be provided with any electrical insulation means in the midway of the pipes or master tubes, with further advantages. Prior to the description of such advantages, explanation will be made of the well-accepted reason why no voltage is produced across the cooling pipes having the above-mentioned construction.

Figure 8:
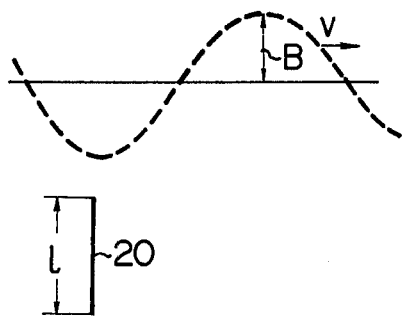
FIG. 8, FIG. 9, FIG. 10A, FIG. 10B and FIG. 10C are schematic diagrams for explaining the relation between the gradients of the cooling pipes and the induced voltages.

Assume that a conductor 20 with the length of $l$(m) is disposed in a magnetic field at right angles to the direction of the magnetic field moving at V (m/s) as shown in FIG. 8. Generally, a voltage $e$ produced in the conductor 20 is $$e = V \cdot B \cdot l \sin \omega t \; (V) \qquad (1)$$

where $\omega$ is $2\pi f$, and $B$ the density of magnetic flux. Thus it will be seen that since the density of magnetic flux B at any point of the conductor 20 at a given time and the velocity V are constant, a constant voltage proportional to the length $l$ is induced across the conductor 20.

Figure 9:
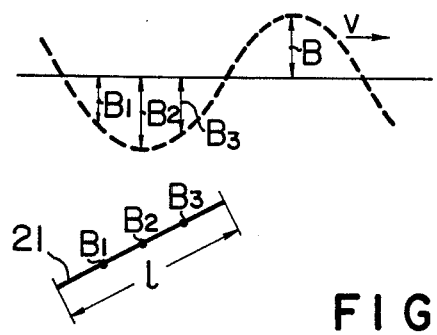

In the event that the conductor is skewed against the magnetic field, on the other hand, the magnetic flux density B at a given time is different one from another at points, for example, $B_1$, $B_2$ and $B_3$, as shown in FIG. 9. Thus, the value of induced voltage in this case is determined by the integration of the magnetic flux B over the length $l$. In other words, the induced voltage in such a case is $$e_1 = V \cdot l \int dB \; (V) \qquad (2)$$

Figure 10A:
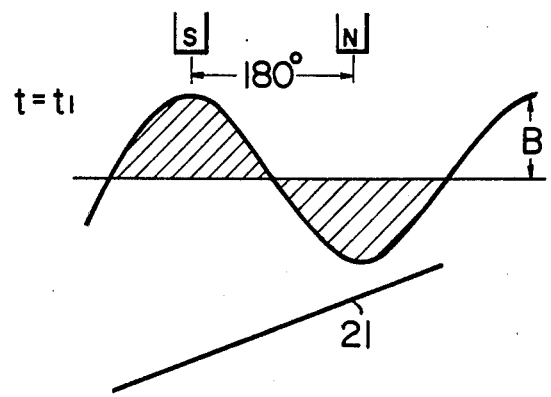
Figure 10B:
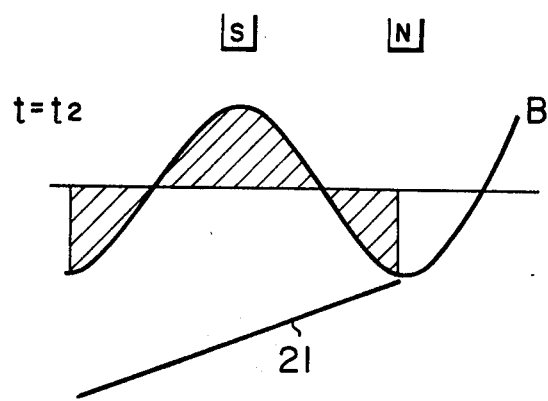
Figure 10C:
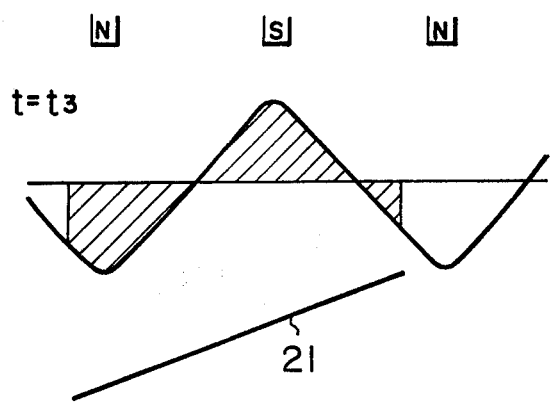

As a result, if a conductor 21 is arranged to be skewed with an electrical angle of $360° \times k$ ($k$: integer), voltages induced in the conductor 21 offset each other to be zero at any point of time $t$, for example $t_1$, $t_2$ and $t_3$ as shown in FIGS. 10A, 10B and 10C respectively. This is because the integration $\int dB$ in the equation (2) is always zero, thus keeping the induced voltage $e_1$ at zero.

In this way, the arrangement of the cooling pipes skewed at an electrical angle of 360° multiplied by integer permits no voltage to be induced across the cooling pipes, so that an ordinary material of cooling pipes such as copper pipes may be effectively used without any trouble of voltage generation, thus solving the problem of cooling medium leakage which otherwise might occur due to the provision of the insulating coupler.

Figure 11:
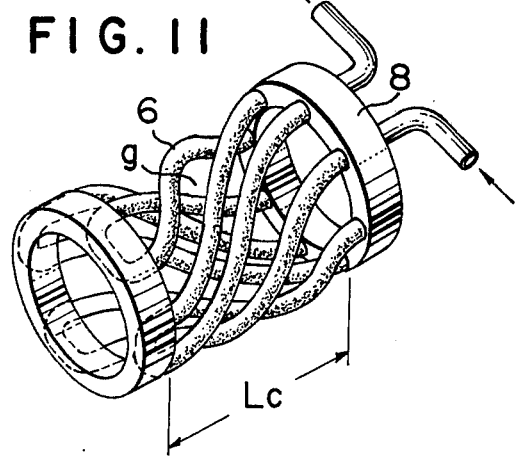
FIG. 11 is a perspective view showing the cooling pipe assembly according to still another embodiment of the invention.

Unlike the aforementioned relative arrangement of the master tubes and the cooling medium supply and exhaust tubes in which a cooling medium is supplied from one end of the cooling pipes and exhausted at the other end thereof, the master tube 8 may alternatively be provided only at one end of the cooling pipes or a gap $g$ may be formed between adjacent cooling pipes 6 as shown in FIG. 11.

In order to prevent an eddy current loss which oterhwise might occur due to variations in magnetic flux in the cooling pipes, pipes as fine as possible should be used as the cooling pipes while taking into consideration the required strength of the pipes and minimum flow rate required. Preferably, the pipes may be non-magnetic ones high in resistance.

In spite of the above explanation that the voltage generation across the cooling pipes is reduced by skewing them at an electrical angle of 360° multiplied by integer over the whole thickness of the stator core, test results show that a voltage is somewhat induced in the cooling pipes by the magnetic flux attributable to the ends of stator winding. This voltage may be minimized by adjusting the length of the cooling pipes as against the thickness of the stator core lamination. Also, this voltage, if induced is as low as several tens of volts and poses no problem in practical applications, in view of the fact that the axial length of the master tube is 1/100 or less of the effective part of the stator in actual use.

It will be understood from the above description that the stator of the rotary electric machine according to the present invention is so constructed that the cooling pipes arranged along the winding strands take the form of a cylindrical frame, so that the cooling pipes in the form of a cylindrical frame securely hold the strands and are mounted on the inner surface of the stator core. Therefore, even the fine and weak strand conductors of the stator winding are adequately and securely held by the cooling pipe frame, thereby providing a rugged stator highly resistive to deformation of the winding which otherwise would result from the shocks attributable to vibrations or short-circuiting cases during the running of the rotary electric machine. Further, no troublesome work for adding special parts or reinforcing members is required to obtain the rugged stator, thus contributing to high working efficiency. The present invention also eliminates the high tension of nerves on the part of a worker which has so far been unavoidable in transporting and assemblying the very fine and easily-deformed strands in the stator core. In other words, a special jig and special cart which have so far required in handling the winding strands to maintain them in shape are replaced by the frame of the cooling pipes according to the invention, thus greatly facilitating the assembly work of the winding.

Furthermore, the stator winding is cooled adequately as the cooling medium flowing in the cooling pipes gains access to the inner strands.

In view of the fact that the cooling pipes arranged among the strand conductors are skewed at the electrical angle of 360° multiplied by integer, a further advantage of the stator results that the cooling pipes are not necessarily made of electrically insulating material but may employ such thermally conductive materials as copper, brass or aluminum. Into the bargain, there is no need for insertion of insulating means or coupler in the midway of the cooling pipes or master tubes, thereby greatly facilitating the construction of the cooling pipes.

It will be thus seen that the objects set forth above, among those made apparent from the preceding description, are efficiently attained and since certain changes may be made in the above constructions without departing from the spirit and scope of the invention, it is intended that all matter contained in the above description or shown in the accompanying drawings shall be interpreted as illustrative and not in a limiting sense.

What we claim is:

1. A stator for a rotary electric machine comprising an annular stator core, a stator winding including a plurality of fine strands and arranged at the inner surface of said stator core, and a plurality of cooling pipes in the form of a separate cylindrical frame fitted onto the inner surface of said stator core, said strands of said winding being supported by said cylindrical frame of said cooling pipes, in which said cylindrical frame of cooling pipes includes in at least double layers of cooling pipes, said strands of said winding being securely supported between said double layers of said cylindrical frame of cooling pipes, and in which said strands of said windings are disposed in winding sections, each of said sections being securely supported between respective adjacent ones of said plurality of cooling pipes in each of said double layers of said cylindrical frame.

2. A stator for a rotary electric machine according to claim 1, in which spacers are disposed between adjacent ones of said winding sections.

* * * * *